(12) United States Patent
Iyer et al.

(10) Patent No.: US 7,307,995 B1
(45) Date of Patent: Dec. 11, 2007

(54) SYSTEM AND METHOD FOR LINKING A PLURALITY OF NETWORK SWITCHES

(75) Inventors: Ram Ganesan Iyer, Houston, TX (US); Hawkins Yao, San Jose, CA (US); Michael Witkowski, Tomball, TX (US); Richard Gunlock, Houston, TX (US)

(73) Assignee: Ciphermax, Inc., Houston, TX (US)

( * ) Notice: Subject to any disclaimer, the term of this patent is extended or adjusted under 35 U.S.C. 154(b) by 923 days.

(21) Appl. No.: 10/117,418

(22) Filed: Apr. 5, 2002

(51) Int. Cl.
*H04L 12/56* (2006.01)

(52) U.S. Cl. .................. 370/395.32; 370/392

(58) Field of Classification Search ........... 370/299, 370/353–356, 362–363, 367–374, 396, 534
See application file for complete search history.

(56) References Cited

U.S. PATENT DOCUMENTS

| | | | |
|---|---|---|---|
| 4,442,504 A | 4/1984 | Dummermuth et al. ..... 364/900 |
| 4,598,404 A | 7/1986 | Perry et al. ................... 371/49 |
| 4,692,073 A | 9/1987 | Martindell ................. 408/239 |
| 4,755,930 A | 7/1988 | Wilson, Jr. et al. ......... 364/200 |
| 4,903,259 A | 2/1990 | Hayano ..................... 370/58.3 |
| 5,140,682 A | 8/1992 | Okura et al. ................ 395/425 |
| 5,247,649 A | 9/1993 | Bandoh ...................... 395/425 |
| 5,289,460 A | 2/1994 | Drake et al. .................. 370/17 |
| 5,377,180 A | 12/1994 | Laurent ....................... 370/16 |
| 5,394,556 A | 2/1995 | Oprescu .................... 395/800 |
| 5,515,376 A | 5/1996 | Murthy et al. ........... 370/85.13 |
| 5,530,832 A | 6/1996 | So et al. .................... 395/449 |
| 5,586,847 A | 12/1996 | Mattern, Jr. et al. ..... 408/239 A |
| 5,602,841 A | 2/1997 | Lebizay et al. ............. 370/413 |
| 5,606,669 A | 2/1997 | Bertin et al. ............. 395/200.2 |
| 5,611,049 A | 3/1997 | Pitts ...................... 395/200.09 |
| 5,699,548 A | 12/1997 | Choudhury et al. ........ 395/469 |
| 5,778,429 A | 7/1998 | Sukegawa et al. .......... 711/129 |
| 5,805,785 A | 9/1998 | Dias et al. ............. 395/182.02 |
| 5,835,756 A | 11/1998 | Caccavale ................... 395/601 |
| 5,835,943 A | 11/1998 | Yohe et al. ................. 711/118 |
| 5,844,887 A * | 12/1998 | Oren et al. ................. 370/218 |
| 5,845,280 A | 12/1998 | Treadwell, III et al. ........ 707/8 |
| 5,845,324 A | 12/1998 | White et al. ................ 711/128 |
| 5,852,717 A | 12/1998 | Bhide et al. ............ 395/200.33 |
| 5,864,854 A | 1/1999 | Boyle .......................... 707/10 |
| 5,873,100 A | 2/1999 | Adams et al. .............. 707/204 |
| 5,878,218 A | 3/1999 | Maddalozzo, Jr. et al. ..................... 395/200.43 |
| 5,881,229 A | 3/1999 | Singh et al. ........... 395/200.33 |
| 5,889,775 A | 3/1999 | Sawicz et al. .............. 370/360 |

(Continued)

OTHER PUBLICATIONS

PCT International Search Report PCT/US01/47769, 3 pages, Mailing Date Apr. 23, 2002.

(Continued)

*Primary Examiner*—Chi Pham
*Assistant Examiner*—Thai Hoang
(74) *Attorney, Agent, or Firm*—Baker Botts L.L.P.

(57) ABSTRACT

A method of linking at least two network switches is disclosed, wherein each network switch switches data traffic of a plurality of devices, through a plurality of couplings. The method comprises the steps of generating a data stream including an identifier to be sent from a first to a second network switch, generating a number identifying one of the couplings from the identifier, and using the identified coupling for transfer of the data stream.

15 Claims, 7 Drawing Sheets

U.S. PATENT DOCUMENTS

| | | | | |
|---|---|---|---|---|
| 5,918,244 | A | 6/1999 | Percival | 711/119 |
| 5,924,864 | A | 7/1999 | Loge et al. | 433/118 |
| 5,930,253 | A | 7/1999 | Brueckheimer et al. | 370/395 |
| 5,933,607 | A | 8/1999 | Tate et al. | 395/200.7 |
| 5,933,849 | A | 8/1999 | Srbljic et al. | 711/118 |
| 5,944,780 | A | 8/1999 | Chase et al. | 709/201 |
| 5,944,789 | A | 8/1999 | Tzelnic et al. | 709/214 |
| 5,978,841 | A | 11/1999 | Berger | 709/217 |
| 5,978,951 | A | 11/1999 | Lawler et al. | 714/758 |
| 5,987,223 | A | 11/1999 | Narukawa et al. | 395/109 |
| 5,991,810 | A | 11/1999 | Shapiro et al. | 709/229 |
| 6,041,058 | A | 3/2000 | Flanders et al. | 370/401 |
| 6,044,406 | A | 3/2000 | Barkey et al. | 709/235 |
| 6,081,883 | A | 6/2000 | Popelka et al. | 712/28 |
| 6,085,234 | A | 7/2000 | Pitts et al. | 709/217 |
| 6,098,096 | A | 8/2000 | Tsirigotis et al. | 709/213 |
| 6,105,062 | A | 8/2000 | Andrews et al. | 709/223 |
| 6,128,306 | A | 10/2000 | Simpson et al. | 370/412 |
| 6,138,209 | A | 10/2000 | Krolak et al. | 711/128 |
| 6,147,976 | A | 11/2000 | Shand et al. | 370/254 |
| 6,243,358 | B1 | 6/2001 | Monin | 370/229 |
| 6,252,514 | B1 | 6/2001 | Nolan et al. | 340/686.4 |
| 6,289,386 | B1 | 9/2001 | Vangemert | 709/232 |
| 6,361,343 | B1 | 3/2002 | Daskalakis et al. | 439/327 |
| 6,400,730 | B1 | 6/2002 | Latif et al. | 370/466 |
| 6,424,657 | B1 | 7/2002 | Voit et al. | 370/412 |
| 6,438,705 | B1 | 8/2002 | Chao et al. | 714/4 |
| 6,457,048 | B2 | 9/2002 | Sondur et al. | 709/220 |
| 6,470,013 | B1 | 10/2002 | Barach et al. | 370/392 |
| 6,484,209 | B1 | 11/2002 | Momirov | 709/238 |
| 6,499,064 | B1 | 12/2002 | Carlson et al. | 709/316 |
| 6,532,501 | B1 | 3/2003 | McCracken | 710/52 |
| 6,584,101 | B2 | 6/2003 | Hagglund et al. | 370/389 |
| 6,594,701 | B1 | 7/2003 | Forin | 709/232 |
| 6,597,689 | B1 | 7/2003 | Chiu et al. | 370/354 |
| 6,597,699 | B1 | 7/2003 | Ayres | 370/400 |
| 6,601,186 | B1 | 7/2003 | Fox et al. | 714/4 |
| 6,615,271 | B1 | 9/2003 | Lauck et al. | 709/232 |
| 6,654,895 | B1 | 11/2003 | Henkhaus et al. | 713/320 |
| 6,657,962 | B1 | 12/2003 | Barri et al. | 370/235 |
| 6,662,219 | B1 | 12/2003 | Nishanov et al. | 709/220 |
| 6,674,756 | B1 | 1/2004 | Rao et al. | 370/395.21 |
| 6,687,247 | B1 | 2/2004 | Wilford et al. | 370/392 |
| 6,704,318 | B1 * | 3/2004 | Stuart et al. | 370/403 |
| 6,721,818 | B1 | 4/2004 | Nakamura | 710/9 |
| 6,731,644 | B1 | 5/2004 | Epps et al. | 370/412 |
| 6,731,832 | B2 | 5/2004 | Alvarez et al. | 385/16 |
| 6,735,174 | B1 | 5/2004 | Hefty et al. | 370/235 |
| 6,747,949 | B1 | 6/2004 | Futral | 370/231 |
| 6,754,206 | B1 | 6/2004 | Nattkemper et al. | 370/369 |
| 6,757,791 | B1 | 6/2004 | O'Grady et al. | 711/154 |
| 6,758,241 | B1 | 7/2004 | Pfund et al. | 137/596 |
| 6,762,995 | B1 | 7/2004 | Drummond-Murray et al. | 370/229 |
| 6,765,871 | B1 | 7/2004 | Knoebel et al. | 370/231 |
| 6,765,919 | B1 | 7/2004 | Banks et al. | 370/401 |
| 6,792,507 | B2 | 9/2004 | Chiou et al. | 711/119 |
| 6,822,957 | B1 | 11/2004 | Schuster et al. | 370/389 |
| 6,839,750 | B1 | 1/2005 | Bauer et al. | 709/223 |
| 6,845,431 | B2 | 1/2005 | Camble et al. | 711/152 |
| 6,847,647 | B1 * | 1/2005 | Wrenn | 370/395.32 |
| 6,850,531 | B1 | 2/2005 | Rao et al. | 370/401 |
| 6,865,602 | B1 | 3/2005 | Nijemcevic et al. | 709/223 |
| 6,876,663 | B2 | 4/2005 | Johnson et al. | 370/416 |
| 6,876,668 | B1 | 4/2005 | Chawla et al. | 370/468 |
| 6,879,559 | B1 | 4/2005 | Blackmon et al. | 370/225 |
| 6,889,245 | B2 | 5/2005 | Taylor et al. | 709/203 |
| 6,938,084 | B2 | 8/2005 | Gamache et al. | 709/226 |
| 6,944,829 | B2 | 9/2005 | Dando | 715/798 |
| 6,954,463 | B1 | 10/2005 | Ma et al. | 370/401 |
| 6,973,229 | B1 | 12/2005 | Tzathas et al. | 385/16 |
| 6,980,515 | B1 | 12/2005 | Schunk et al. | 370/230.1 |
| 6,983,303 | B2 | 1/2006 | Pellegrino et al. | 709/203 |
| 6,985,490 | B2 * | 1/2006 | Czeiger et al. | 370/401 |
| 6,988,149 | B2 | 1/2006 | Odenwald | 709/250 |
| 7,006,438 | B2 | 2/2006 | West et al. | 370/231 |
| 7,010,715 | B2 | 3/2006 | Barbas et al. | 714/4 |
| 7,013,084 | B2 | 3/2006 | Battou et al. | 398/45 |
| 7,035,212 | B1 | 4/2006 | Mittal et al. | 370/230 |
| 7,079,485 | B1 | 7/2006 | Lau et al. | 370/229 |
| 7,190,695 | B2 * | 3/2007 | Schaub et al. | 370/392 |
| 2001/0023443 | A1 | 9/2001 | Fichou et al. | 709/227 |
| 2001/0037435 | A1 | 11/2001 | Van Doren | 711/153 |
| 2001/0043564 | A1 | 11/2001 | Bloch et al. | 370/230 |
| 2002/0004842 | A1 | 1/2002 | Ghose et al. | 709/235 |
| 2002/0010790 | A1 | 1/2002 | Ellis et al. | 709/238 |
| 2002/0012344 | A1 | 1/2002 | Johnson et al. | 370/389 |
| 2002/0024953 | A1 | 2/2002 | Davis et al. | 370/395.1 |
| 2002/0034178 | A1 | 3/2002 | Schmidt et al. | 370/386 |
| 2002/0071439 | A1 | 6/2002 | Reeves et al. | 370/400 |
| 2002/0078299 | A1 | 6/2002 | Chiou et al. | 711/119 |
| 2002/0103921 | A1 | 8/2002 | Nair et al. | 709/232 |
| 2002/0118682 | A1 * | 8/2002 | Choe | 370/395.31 |
| 2002/0165962 | A1 | 11/2002 | Alvarez et al. | 709/226 |
| 2002/0176131 | A1 | 11/2002 | Walters et al. | 359/118 |
| 2002/0186703 | A1 | 12/2002 | West et al. | 370/413 |
| 2002/0188786 | A1 | 12/2002 | Barrow et al. | 710/300 |
| 2003/0002506 | A1 | 1/2003 | Moriwaki et al. | 370/392 |
| 2003/0012204 | A1 | 1/2003 | Czeiger et al. | 370/401 |
| 2003/0014540 | A1 | 1/2003 | Sultan et al. | 709/240 |
| 2003/0026267 | A1 * | 2/2003 | Oberman et al. | 370/397 |
| 2003/0033346 | A1 | 2/2003 | Carlson et al. | 709/104 |
| 2003/0037022 | A1 * | 2/2003 | Adya et al. | 707/1 |
| 2003/0037177 | A1 | 2/2003 | Sutton et al. | 709/316 |
| 2003/0048792 | A1 | 3/2003 | Xu et al. | 370/400 |
| 2003/0063348 | A1 | 4/2003 | Posey, Jr. | 359/139 |
| 2003/0074449 | A1 | 4/2003 | Smith et al. | 709/226 |
| 2003/0084219 | A1 | 5/2003 | Yao et al. | 710/300 |
| 2003/0091267 | A1 | 5/2003 | Alvarez et al. | 385/16 |
| 2003/0093541 | A1 | 5/2003 | Lolayekar et al. | 709/230 |
| 2003/0093567 | A1 | 5/2003 | Lolayekar et al. | 709/246 |
| 2003/0097439 | A1 * | 5/2003 | Strayer et al. | 709/224 |
| 2003/0097445 | A1 | 5/2003 | Todd et al. | 709/226 |
| 2003/0123274 | A1 * | 7/2003 | Cambie et al. | 365/100 |
| 2003/0126223 | A1 | 7/2003 | Jenne et al. | 709/212 |
| 2003/0126280 | A1 | 7/2003 | Hawkins et al. | 709/234 |
| 2003/0126297 | A1 | 7/2003 | Olarig et al. | 709/250 |
| 2003/0128703 | A1 | 7/2003 | Zhao et al. | 370/392 |
| 2003/0152182 | A1 * | 8/2003 | Pai et al. | 375/372 |
| 2003/0154301 | A1 | 8/2003 | McEachern et al. | 709/237 |
| 2003/0163555 | A1 | 8/2003 | Battou et al. | 709/223 |
| 2003/0163592 | A1 * | 8/2003 | Odenwald | 709/250 |
| 2003/0195956 | A1 | 10/2003 | Bramhall et al. | 709/223 |
| 2003/0198231 | A1 | 10/2003 | Kalkunte et al. | 370/395.31 |
| 2003/0202520 | A1 | 10/2003 | Witkowski et al. | 370/400 |
| 2005/0018619 | A1 | 1/2005 | Banks et al. | 370/254 |
| 2005/0018709 | A1 | 1/2005 | Barrow et al. | 370/465 |
| 2005/0044354 | A1 | 2/2005 | Hagerman | 713/160 |
| 2005/0243734 | A1 | 11/2005 | Nemirovsky et al. | 370/252 |

OTHER PUBLICATIONS

U.S. Appl. No. 10/117,040 entitled "System and Method for Expansion of Computer Network Switching System Without Disruption Thereof," filed Apr. 5, 2002 by Mark Oelke et al.

U.S. Appl. No. 10/117,266 entitled "System and Method for Guarnateed Link Layer Flow Control," filed Apr. 5, 2002 by Hani Ajus et al.

U.S. Appl. No. 10/117,638 entitled "Fibre Channel Implementation Using Network Processors," filed Apr. 5, 2002 by Yao Hawkins et al.

U.S. Appl. No. 10/117,290 entitled "Method and System for Reduced Distributed Event Handling in a Network Environment," filed Apr. 5, 2002 by Huang Ruotao et al.

A. Banerjea et al.; "Fault Recovery For Guaranteed Performance Communications Connections"; IEEE/ACM Transactions on Networking, vol. 7, No. 5; pp. 653-668, Oct. 1999.

P. Newman et al.; "IP Switching-ATM Under IP"; IEEE/ACM Transactions on Networking, vol. 6, No. 2; pp. 117-129, Apr. 1998.

N. Lynch et al.; "The Data Link Layer: Two Impossibility Results."; Proceedings of the Seventh Annual ACM Symposium on Principles of Distributed Computing; ACM Press; pp. 149-170, Jan. 1988.

J. Kim et al.; "Bandwidth Allocation in Wireless Networks with Guaranteed Packet-Loss Performance"; IEEE/ACM TRansactions on Networking, vol. 8, No. 3; pp. 337-349, Jun. 2000.

"Microsoft Computer Dictionary: Fifth Edition"; Microsoft Press; pp. 3, 2002.

Mary Baker et al., "The Recovery Box: Using Fast Recovery to Provide High Availability in the UNIX Environment," *Summer '92 USENIX* (pp. 31-43), Jun. 8, 1992.

George Candea et al., "Microreboot—A Technique for Cheap Recovery," *Computer Systems Lab*, Stanford University, http://swig.stanford.edu/~candea/papers/microreboot/html/index.html (31 pages), Dec. 1, 2004.

* cited by examiner

SYSTEM AND METHOD FOR LINKING A PLURALITY OF NETWORK SWITCHES

CROSS-REFERENCE TO RELATED APPLICATIONS

This application is related to U.S. patent application Ser. No. 09/738,960 filed on Dec. 14, 2000, now U.S. Pat. No. 6,792,507; U.S. patent application Ser. No. 10/015,047 filed on Oct. 26, 2001; U.S. patent application Ser. No. 10/039,190 filed on Dec. 31, 2001, now abandoned; U.S. patent application Ser. No. 10/039,189 filed on Dec. 31, 2001; and U.S. patent application Ser. No. 10/039,184 filed on Dec. 31, 2001, all of which are incorporated herein by reference in its entirety for all purposes. This application is also related to the following four U.S. patent applications which are being filed concurrently herewith: U.S. patent application Ser. No. 10/117,040 entitled "System and Method for Expansion of Computer Network Switching System Without Disruption Thereof"; U.S. patent application Ser. No. 10/117,266 entitled "System and Method for Guaranteed Link Layer Flow Control"; U.S. patent application Ser. No. 10/117,638 entitled "Fibre Channel Implementation Using Network Processors"; U.S. patent application Ser. No. 10/117,290 entitled "Method and System for Reduced Distributed Event Handling in a Network Environment", and each of which are incorporated herein by reference in its entirety for all purposes.

FIELD OF THE INVENTION

The present invention is related to computer networks. More specifically, the present application is related to a system and method for linking a plurality of network switches.

BACKGROUND OF THE INVENTION TECHNOLOGY

Current Storage Area Networks ("SAN"s) are designed to carry block storage traffic over predominantly Fibre Channel standard medium and protocols using fabric networks comprising local area networks ("LAN"s). Expansion of SAN fabric networks is limited in that conventional SAN fabric channels cannot be implemented over geographically distant locations. Conventional Fibre Channel architecture is not suitable for wide area network ("WAN")/LAN applications. While SCSI and Ethernet may be used to implement a WAN/LAN, these two protocols are not efficient for storage applications. Accordingly, current SAN fabric networks are limited to a single geographic location.

There exist several proposals for moving block storage traffic over SANs built on other networking medium and protocol technologies such as Gigabit Ethernet, ATM/SONET, Infiniband, and the like. Presently, to bridge or interconnect storage data traffic from SANs using one medium/protocol type to another SAN using an incompatible protocol/medium type requires devices and software that perform the necessary protocol/medium translations. These translation devices, hereinafter referred to as "translation bridges," make the necessary translations between incompatible protocol/mediums in order to serve the host computers/servers and storage target devices (the "clients"). Interconnecting heterogeneous SANs that may be easily scaled upward using these translation bridges is very difficult because the translation bridges usually become the bottleneck in speed of data transfer when the clients (servers and/or storage devices) become larger in number. In addition, in a mixed protocol environment and when the number of different protocols increase, the complexity of the software installed on the translation bridges increases, which further impacts performance.

A limitation of the size of SAN fabric networks, in terms of storage capacity, is cost and manpower. In order to expand the storage capacity of a SAN fabric network, storage devices such as disk drives, controllers, fiber channel switches and hubs, and other hardware must be purchased, interconnected and made functionally operable together. Another major, if not primary, expense is the cost of managing a SAN. SAN management requires a lot of manpower for maintenance and planning. For example, as storage capacity grows, issues such as determining server access to storage devices, backup strategy, data replication, data recovery, and other considerations become more complex.

It is desirable that next generation storage network switch systems will have ingress and egress ports that support different protocols and network media so that different types of host computer/servers and storage target devices may be attached directly to the switch system and start communicating with each other without translation overhead. In order to communicate between any two ports, the source and destination ports must be identifiable in both the source and destination protocol. For example, to send a message or frame from a Fibre Channel port to a Gigabit Ethernet port, the destination port needs to appear as a Fibre Channel port to the connected Fibre Channel source, and the source port needs to appear as a Gigabit Ethernet port to the destination port.

SAN and networking products are usually used in mission critical applications and housed in chassis or racks. When a customer wants to expand this system, one or more chassis are added into the existing domain. However, the user has to power down the existing system and reconnect the new chassis into the existing system. Once the new configuration or topology is complete, the user will have to power on the new system. Unfortunately, this upgrade causes system downtime and potential loss of revenue.

Switches have a limited resource—the switch fabric or routing core. A non-blocking switch must have enough bandwidth to receive traffic at full speed from all ingress ports and direct the traffic to the egress ports without dropping traffic, assuming that the traffic is spread equally across all egress ports and does not congest one of them. Therefore, if all ports connected to the switch have the same data rate, then the switch fabric must have bandwidth greater than the number of ports multiplied by the port speed if it wants to be a non-blocking switch that does not drop traffic.

The problem with existing switches is that the internal switch fabric is fixed in size. If large scalability is desired one has to pay for a large switch fabric that initially is not needed. In present systems a smaller switch has to be replaced when more capacity is needed by a larger switch. This is a disruptive upgrade that causes all nodes connected to the switch to lose connectivity while the upgrade is occurring. In another scenario, multiple smaller switches can be interconnected using lower bandwidth interconnects. However, these interconnects can become congested and limit the throughput of the network.

The majority of the SAN switches are not expandable and typically have a limited number of ports, for example, 16 ports. When a customer needs more than 16 ports, two or more of the 16 port switches must be connected together. Unfortunately, to achieve a non-blocking switch in a typical configuration half of the ports on the switch are then used for interconnect purposes. As every switch system is internally limited to a specific amount of devices that can be coupled with each switch such an interconnection is not desirable. Expansion of an internally fully expanded system can be further achieved through special designed trunk couplings. These couplings are, however, limited in their flexibility as their assignment to the plurality of channels of each switch is static and, thus, not very flexible. It is, therefore, highly likely that traffic within the switch system will be blocked due to an already in-use trunk coupling.

Thus, there is a demand for a more user friendly system reducing the downtime and overall cost of a network switch fabric system.

SUMMARY OF THE INVENTION

The invention overcomes the above-identified problems as well as other shortcomings and deficiencies of existing technologies by providing a storage network device that performs a multiplicity of functions and has a multiplicity of port types to allow it to connect to a variety of network types (e.g., Fibre Channel, Gigabit Ethernet, etc.) and is easily maintainable and/or can be easily upgraded with either minimal or no downtime.

A primary function of the invention is to act as a storage network switch where frames are switched from port to port. However, because of its architecture, the present invention has the ability to perform many additional functions that take advantage of its high performance, highly scalable, and highly programmable infrastructure. The switch architecture of the present invention is comprised of: 1) a Switch Fabric Subsystem, 2) I/O Subsystems, 3) Application Subsystems, and 4) System Control Subsystems.

The Switch Fabric Subsystem is a protocol agnostic cell or packet switching infrastructure that provides the high performance and highly scalable interconnections between the I/O Subsystems and Application Subsystems. It provides primary data paths for network traffic being moved by the switch. The I/O Subsystems provide the actual port connectivity to the external network devices that use the switch to communicate with other external network devices. The I/O Subsystems are part of the data path and are responsible for making the high performance, low level decoding of ingress frames from the external ports; and switching/routing, identifying the destination I/O subsystem for the frame, and queuing the frame for transmission through the Switching Fabric. The I/O Subsystems process packets at the very lowest protocol levels (Data Link and Network Layer of the OSI Model) where fast switching and routing decisions can be made. The Application Subsystems provide the platforms for higher level processing of frames and data streams in the switch system. The Application Subsystems have more advanced programmability and functionality than the I/O Subsystems, but rely on the control and data information provided by the I/O Subsystems to maintain high performance packet throughput. Typical applications that can run on the Application Subsystems are caching, storage virtualization, file serving, and high level protocol conversion. The System Control Subsystems provide the overall management of the storage network switch. Most of the low level switching and routing protocol functions are executed on the System Control Subsystems. In addition, management access functions such as the SNMP agent, web server, telnet server, and the direct command line interface reside on the System Control Subsystems. The hardware and software executing on the System Control Subsystems are responsible for managing the other subsystems in the network storage switch.

The present invention is directed to a method of linking at least two network switches, wherein each network switch switches data traffic of a plurality of devices, through a plurality of couplings, wherein the method comprises the steps of:

generating a data stream including an identifier to be sent from a first to a second network switch;

generating a number identifying one of the couplings from the identifier;

using the identified coupling for transfer of the data stream.

The present invention is also directed to a network switch for coupling a plurality of devices and for switching data traffic between the devices comprising:

a plurality of couplings for coupling the network switch with another network switch;

a multiplexer unit for directing a data stream to one of the couplings;

a control unit for extracting an identifier from the data stream and for generating a number identifying one of the couplings from the identifier.

The present invention is furthermore directed to a network switch system comprising at least a first and a second network switch coupled through a plurality of couplings wherein each network switch is coupling a plurality of devices for switching data traffic between the devices and wherein each network switch further comprises:

a multiplexer unit for directing a data stream to one of the couplings; and a control unit for extracting an identifier from the data stream and for generating a number identifying one of the couplings from the identifier.

BRIEF DESCRIPTION OF THE DRAWINGS

A more complete understanding of the present disclosure and advantages thereof may be acquired by referring to the following description taken in conjunction with the accompanying drawings wherein.

Figure 1:
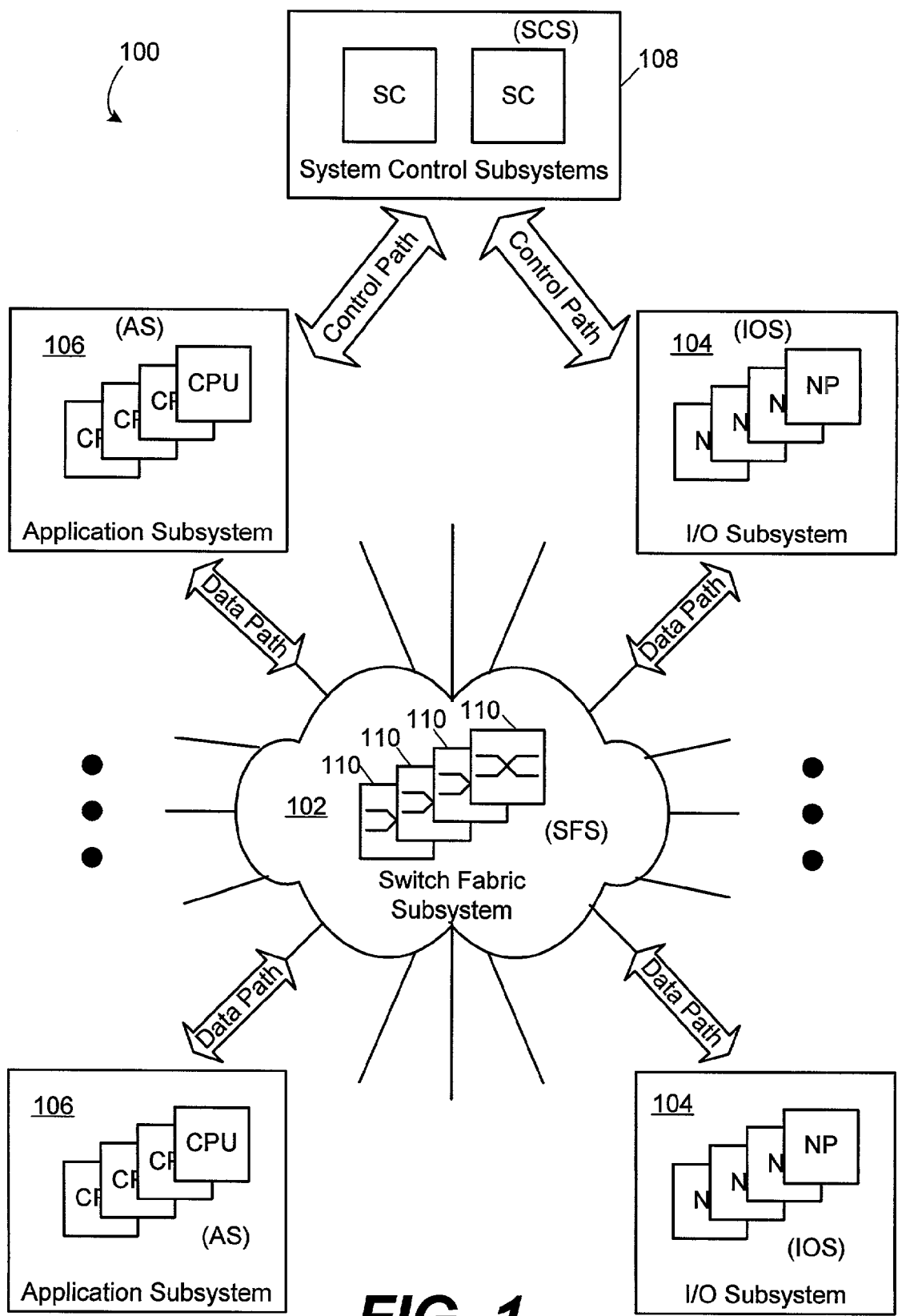
FIG. 1 is a conceptual schematic system architecture of a network storage switch, according to an exemplary embodiment of the present invention.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

The present invention is directed to a storage network device that performs a multiplicity of functions and has a multiplicity of port types to allow it to connect to a variety of network types (e.g., Fibre Channel, Gigabit Ethernet, etc.). A primary function of the invention is to act as a storage network switch wherein frames are switched from port to port. However, because of its architecture, the present invention has the ability to perform many additional functions that take advantage of its high performance, highly scalable, and highly programmable infrastructure.

The following description of the exemplary embodiments of the present invention contains a number of technical terms using abbreviations and/or acronyms which are defined herein and used hereinafter:

| | |
|---|---|
| AP | Application Processor |
| AS | Application Subsystem |
| BMC | Buffer Management Coprocessor |
| EMU | Environmental Monitoring Units |
| FC | Fibre Channel |
| FCP | Fabric Coprocessor |
| FIOC | Fabric I/O Controller |
| FP | Fabric Processor |
| Gb/s | gigabits per second |
| I/O | input-output |
| IOP | Input/Output Processor |
| IOS | I/O Subsystem |
| IPC | Interprocessor Communications Ethernet Controllers |
| LCP | Line Card Processor |
| MAC | Media Access Control |
| North Bridge | combination memory controller and I/O bus bridge |
| NP | Network Processor(s) |
| PAB | Port Aggregation Bridge |
| PCI | Peripheral Component Interconnect |
| QMC | queue management coprocessor |
| SAN | storage area network |
| SCC | System Control Cards |
| SCP | System Control Processor |
| SCS | System Control Subsystem |
| SERDES | external serializer/deserializer |
| SFI | Switch Fabric Interface |
| SFS | Switch Fabric Subsystem |
| TLC | table lookup coprocessor |
| XP | executive coprocessor |

Referring now to the drawings, the details of an exemplary specific embodiment of the invention is schematically illustrated. Like elements in the drawings will be represented by like numbers, and similar elements will be represented by like numbers with a different lower case letter suffix.

FIG. 1 illustrates a conceptual schematic system architecture of a storage network switch, according to an exemplary embodiment of the present invention. The Storage Network Switch, generally represented by the numeral 100, comprises: 1) a Switch Fabric Subsystem 102, 2) I/O Subsystems 104, 3) Application Subsystems 106, and 4) System Control Subsystems 108. The Switch Fabric Subsystem ("SFS") 102 is a protocol agnostic cell or packet switching infrastructure that provides the high performance and highly scalable interconnections between the I/O Subsystems 104 and Application Subsystems 106. It provides primary data paths for network traffic being moved by the Storage Network Switch 100. The I/O Subsystems 104 provide the actual port connectivity to the external network devices that use the Storage Network Switch 100 to communicate with other external network devices (not illustrated). The I/O Subsystems 104 are part of the data path and are responsible for making the high performance, low level decoding of ingress frames from the external ports; and switching/routing, identifying the destination I/O Subsystem 104 for the frame, and queuing the frame for transmission through the Switch Fabric Subsystem 102. The I/O Subsystems 104 process packets at the very lowest protocols levels (Data Link and Network Layer of the OSI Model) where fast switching and routing decisions can be made. The Application Subsystems 106 provide the platforms for higher level processing of frames and data streams in the Storage Network Switch 100. The Application Subsystems 106 have more advanced programmability and functionality than the I/O Subsystems 104, but rely on the control and data information provided by the I/O Subsystems 104 to maintain high performance packet throughput. Typical applications that can run on the Application Subsystems 106 are caching, storage virtualization, file serving, and high level protocol conversion. The System Control Subsystems 108 provide the overall management of the Storage Network Switch 100. Most of the low level switching and routing protocol functions are executed on the System Control Subsystems 108. In addition, management access functions such as the SNMP agent, web server, telnet server, and the direct command line interface reside on the System Control Subsystems 108. The hardware and software executing on the System Control Subsystems 108 are responsible for managing the other subsystems (104, 106) in the Storage Network Switch 100.

The Switch Fabric Subsystem ("SFS") 102 is responsible for routing the plurality of data channels from and to the respective ingress and egress ports of each line card. Each line card comprises a plurality of links for coupling with the switches included in the switch fabric cards. These links can be optical or electrical. Each switch in a switch fabric card is linked with all line cards through one of these links which are hereinafter called ports. Each link usually consists of a separate receiving and transmitting line. Thus, if a system comprises, for example, 16 line cards, each switch must be able to receive 16 links. Such a coupling is hereinafter called a 16-port link. To provide sufficient bandwidth, each line card provides a plurality of links. Thus, for example, 12 high speed links per line card can be provided. To provide the maximum bandwidth, 12 switches must be implemented. In one embodiment of the present invention, for example, 3 line cards are provided wherein each line card comprises 4 independent switches, thus, providing 12 independent switches. However, if the necessary bandwidth is less than the maximum bandwidth, for example, when only a subset of line cards is installed, only one or two switch fabric cards can be implemented.

Figure 2:
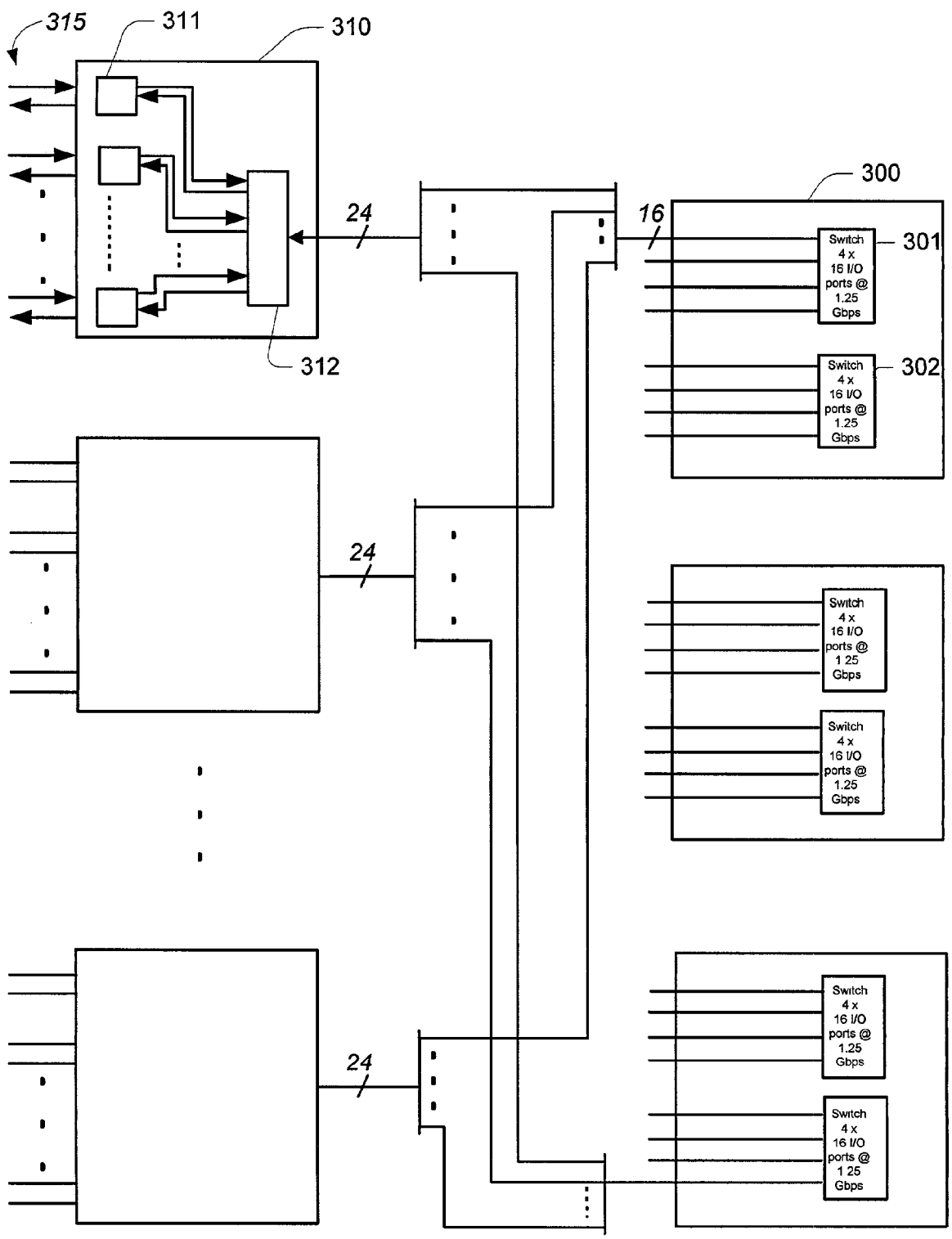
FIG. 2 is a schematic block diagram showing the interconnection of switch fabric cards and line cards according to one embodiment of the invention.

FIG. 2 shows a network switching system with a plurality of switch fabric cards and a plurality of line cards having a plurality of ports to couple external devices such as workstations, mass storage devices, such as RAID, hard drive systems, etc. FIG. 2, in particular, shows the interconnection between these elements, for example, by means of a backplane between a plurality of line cards and the switch fabric cards within one chassis according to an exemplary embodiment of the present invention using a maximum of m/2=16 line cards. Each line card 310 comprises, for example, 10 ingress and egress ports 311 coupling external application or I/O subsystems through optical or electrical connections 315. Each line card 310 also comprises a switch fabric interface 312 for coupling the different data paths with the switch fabric cards 300. To this end, for example, 24 1.25 Gbps serial links, each link having a separate transmit and receive line, are connected to the switch fabric. In this embodiment, three switch fabric cards 300 are provided.

Each switch fabric card provides two switch fabric chips 301 and 302 which can be configured in different modes. For example, the switch fabric chip 301, 302 can be configured in a first mode to comprise a single 64-port switch. In a second mode, the chip provides two independent 32-port switches and in a third mode it provides four independent 16-port switches. Each port comprises separate transmit and receive lines per link. In the embodiment shown in FIG. 3, a maximum of 16 line cards 310 can be added to the system. The switch fabric chip 301, 302 are configured in mode 3 to provide four independent 16-port switches. With three switch fabric cards 300 implemented, a total of 24 16-port switches is available. Thus, every link of each line card 310 can be coupled with one link of the 24 16-port switches provided by the three fabric switch cards 300. If fewer switch fabric cards are implemented, the respective ports remain unconnected. Thus, every link of each line card 310 can be coupled with a link from another line card 310 through one of the switches. The system further provides enough redundancy to ensure that no congestion occurs whenever a coupling malfunctions. In case of malfunction of a coupling, the system reroutes the data path through one of the remaining functioning couplings.

The present invention takes advantage of the switching and rerouting capabilities of the system. Thus, if only a certain number of line cards 310 are implemented only a certain number of switch fabric cards 300 is needed. In case the system has to be expanded, an additional switch fabric card 300 and more line cards 310 can be inserted into the chassis. In this embodiment, one chassis can receive up to three switch fabric cards 300 and up to 16 line cards 310. Thus, the system can be easily expanded, for example, using one chassis it is possible to install 16 line cards and, thus, a maximum of 160 ports can be established.

However, each system comprises a limit and can, thus, only be expanded by linking multiple network switches to form a larger network. When interconnecting multiple network switches to form a larger network, trunking, or link aggregation is often implemented to distribute traffic across multiple links when those links form equal-cost paths. For example, in a Fibre Channel network, the interconnecting switches employ the Fabric Shortest Path First algorithm as defined in the Fibre Channel Standard to determine path cost. When multiple equal-cost paths are found, the inter-switch links that form those paths become candidates for link aggregation.

Figure 3:
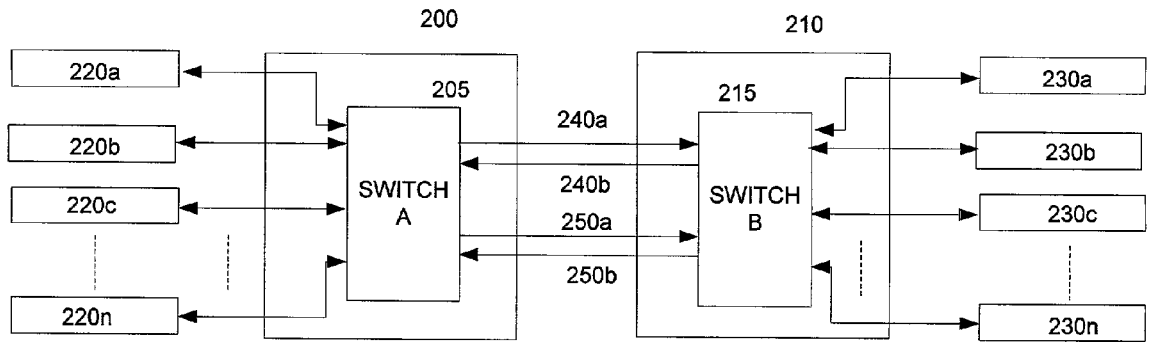
FIG. 3 is a schematic block diagram showing the coupling of two network switches according to the present invention.

For example, a first switch system 200 and a second switch system 210 are linked by a special coupling 240a and 240b, and 250a and 250b as shown in FIG. 3. Each switch system 200, 210 can be any kind of switch system, for example, a system as shown in FIG. 2. Each switch system 200, 210 comprises a single or multiple switch fabric devices 205, 215 that include, for example, line cards and switch fabric cards. A plurality of devices 220a, 220b, 220c, . . . 220n are coupled with the first system 200 and a plurality of devices 230a, 230b, 230c, . . . 230n are coupled with the second system 210.

FIG. 3 illustrates some examples of equal-cost paths and the links that can be aggregated to form a trunk Device 220a-link 240a-Device 230a Device 220b-link 250a-Device 230a Device 230c-link 240b-Device 220c Device 230b-link 250b-Device 220b are all equal-cost paths. Thus, link 240a and link 250a can be trunked. Once a trunk, or an aggregated link is determined, the actual routing of data traffic often has to conform to the restriction that the most basic unit of information in a data stream should traverse the same path to ensure in-order delivery. Because of this restriction, most implementations of trunking have been device-based. Most implementations allow the assignment of link 240a for traffic coming into switch A and targeting device 230a, link 250a for data targeting device 230b. This scheme cycles back to link 240a for data targeting device 230c, etc. Although several variations to this scheme exist, such as source-device-based instead of destination-device-based, they are all device ID based.

Known device-ID based trunking algorithms are all coarse-grained. The granularity of the information unit is all the data from a device or to a device. The shortcoming of this scheme is that there is no attempt to distribute traffic to a different link of a trunk for different devices once the links are assigned to a set of devices.

For example, if link 240a in FIG. 3 is assigned for data from switch 200 targeting device 230b, and link 250a for traffic targeting device 230c, even in the situation that device 230b is not receiving any data traffic, any data targeting device 230c will only use link 250a while link 240a is idle. There is not a mechanism in place to distribute that traffic to link 240a.

The present invention overcomes this disadvantage. Examining the Fibre Channel Protocol more closely, the most basic unit of information in a data stream where ordering needs to be preserved is an exchange. The Fibre Channel Standard defines a data stream as a compilation of exchanges. An exchange is a compilation of sequences, and a sequence is a compilation of frames. Data frames from different exchanges are independent of one another and there is not an ordering restriction between frames of different exchanges. Fibre Channel exchanges are identified by an exchange ID. This exchange ID, for example, a 16-bit value, increments sequentially for every exchange until this ID wraps around to 0 after it increments past 65535. Therefore, a better distribution of data traffic with a distribution scheme based on this exchange ID can be achieved. A hashing function is devised to determine a route for an incoming frame to determine a specific link in a trunk that this frame will take. This scheme operates as follows.

When an incoming frame arrives at Switch 200, the exchange-ID of that frame is passed to a hashing function. The hashing function returns a value that falls inclusively between the smallest and largest identifier that denotes the links in the trunk. The frame routing component of the switch then passes this frame to the link with this identifier.

A better distribution can be achieved with the exchange-level trunking than that of a device-ID based algorithm because the links are not bound to any device. Exchanges from multiple devices are distributed to the links in a trunk irrespective of the device from which the exchanges arrive, or to which device the exchanges are destined. The distribution of received data stream is done within the respective receiving switch by means of a respective data stream portion identifying the recipient.

While there exists a large number of hashing functions that will work with this scheme, a simple and most-straight forward hash function that will be used to illustrate the exchange-level trunking mechanism is the ceiling adjusted modulo function. This function is used instead of a straight modulo function for several reasons. The routing decision often needs to be done in the shortest time possible to minimize switching latency. The general modulo function requires a division operation that requires a long computing time. In a switch, a hardware-accelerated divider is often not available to the routing component, thus making the division operation infeasible since division implemented in software consumes a large portion of code space and aggravates the long computing time.

The ceiling adjusted modulo function computes the remainder of the exchange-ID divided by the next power of two higher than the number of links in a trunk, then adjusted to fall within the number of links in a trunk. This can be shown by the following pseudo-code, assuming a zero-based link ID that goes from 0 to number_of links−1:

BitPosition:=(the highest position of a binary 1 bit in the Number_of_links)+1;
Next2Power:=1 shifted left by BitPosition;
Link:=Exchange_ID AND (Next2Power−1);
If Link greater than or equal to the Number_of_links
Link:=Link−Number_of_links;

The following Table 1 shows the operands and the results obtained when the ceiling adjusted modulo function is applied:

TABLE 1

| Exchange_ ID | Number_of_links | BitPosition | Next2Power | Output Link |
| --- | --- | --- | --- | --- |
| 0 | 5 | 3 | 8 | 0 |
| 1 | 5 | 3 | 8 | 1 |
| 2 | 5 | 3 | 8 | 2 |
| 3 | 5 | 3 | 8 | 3 |
| 4 | 5 | 3 | 8 | 4 |
| 5 | 5 | 3 | 8 | 0 |
| 6 | 5 | 3 | 8 | 1 |
| 34 | 5 | 3 | 8 | 2 |

As another example showing the use of the ceiling adjusted modulo function for trunk link determination, the following Table 2 gives a few values for a trunk configuration consisting of 21 links.

TABLE 2

| Exchange_ ID | Number_of_links | BitPosition | Next2Power | Output Link |
| --- | --- | --- | --- | --- |
| 0 | 21 | 5 | 32 | 0 |
| 1 | 21 | 5 | 32 | 1 |
| 2 | 21 | 5 | 32 | 2 |
| 26 | 21 | 5 | 32 | 5 |
| 27 | 21 | 5 | 32 | 6 |
| 28 | 21 | 5 | 32 | 7 |
| 50 | 21 | 5 | 32 | 18 |
| 51 | 21 | 5 | 32 | 19 |
| 52 | 21 | 5 | 32 | 20 |
| 53 | 21 | 5 | 32 | 0 |

With the ceiling adjusted modulo function, the most optimal traffic distribution can be achieved when the number of links in a trunk is exactly a power of 2. When the number of links is not a power of 2, a traffic distribution better than a device-based trunking can still be achieved.

Figure 4:
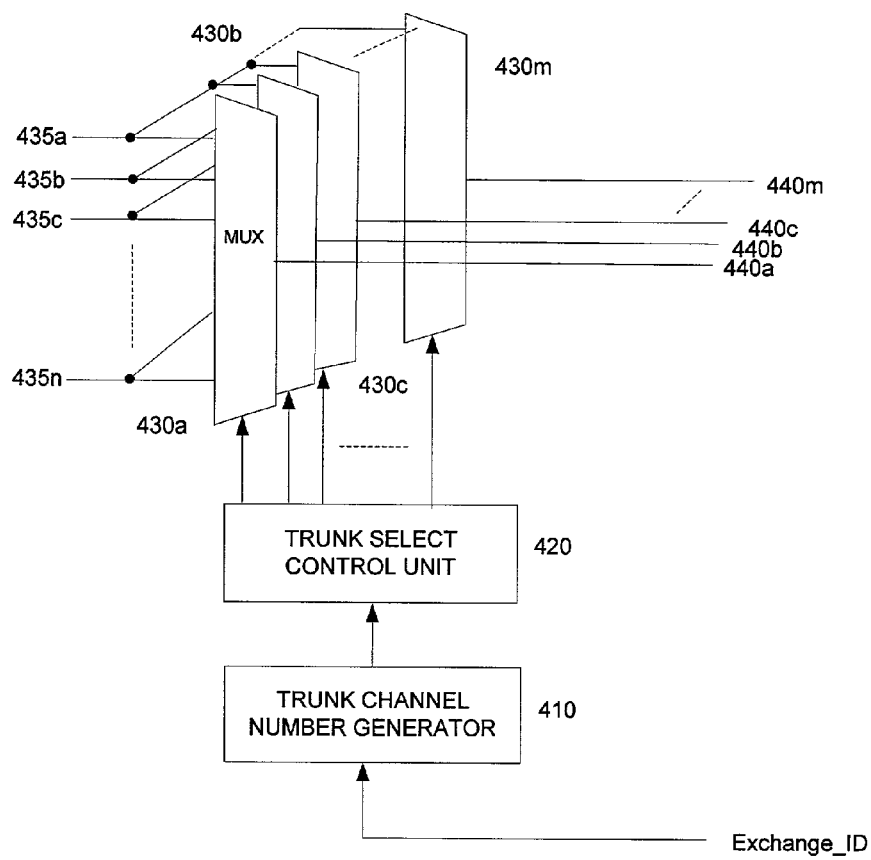
FIG. 4 is a schematic circuit diagram of a trunk coupling within a switch according to the present invention.

FIG. 4 shows an exemplary embodiment of a switch link combining at least two switch fabric systems according to the present invention. FIG. 4 shows, for the sake of simplicity, only the coupling in one direction. It is assumed that the switch link comprises m lines for coupling two network switches. Each switch is able to switch traffic for n devices and thus comprises n ports. A plurality of m multiplexers 430a, 430b, 430c, . . . 430m is provided wherein the input of each multiplexer 430a, 430b, 430c, . . . 430m is coupled with the n devices through lines 435a, 435b, 435c, . . . 435n. The actual switch link is designated with numerals 440a, 440b, 440c, . . . 440m. A trunk select control unit 420 controls the selection of each multiplexer 430a, 430b, 430c, . . . 430m. Trunk select control unit 420 is coupled with a trunk channel number generator 410 which receives the actual exchange_ID for generating a trunk channel number, for example, according to the above described ceiling adjusted modulo function.

Whenever a new transfer from the switch to another switch is requested, an exchange_ID is fed to trunk channel number generator 410. Trunk channel number generator 410 then generates the respective trunk channel number, for example, by the above described ceiling adjusted modulo function. Trunk select control unit 420 then activates the respective multiplexer and selects the respective input 435a, 435b, 435c, . . . 435n.

Figure 5:
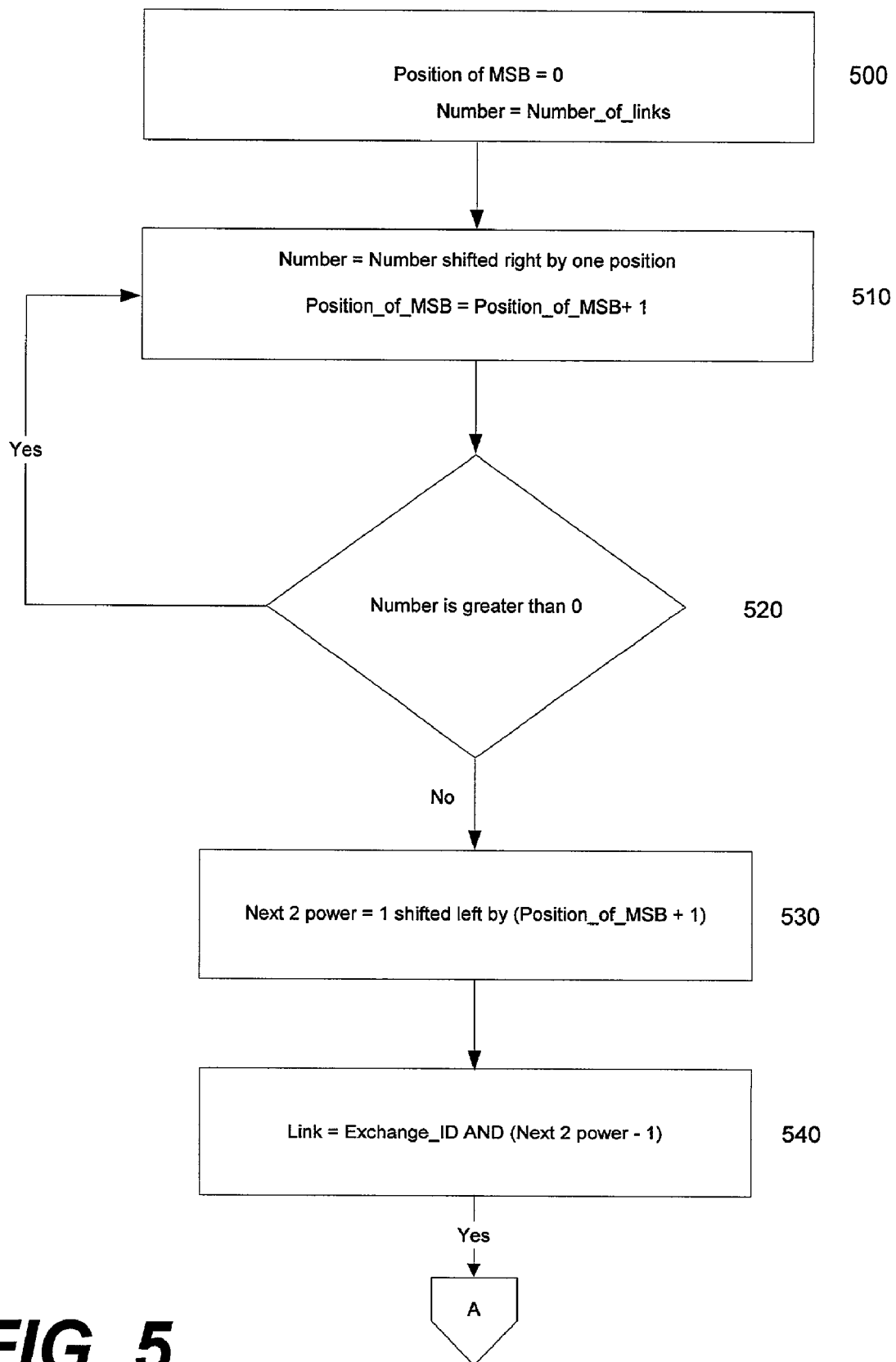
FIGS. 5-8 are flow chart diagrams showing an embodiment of the present invention.
Figure 6:
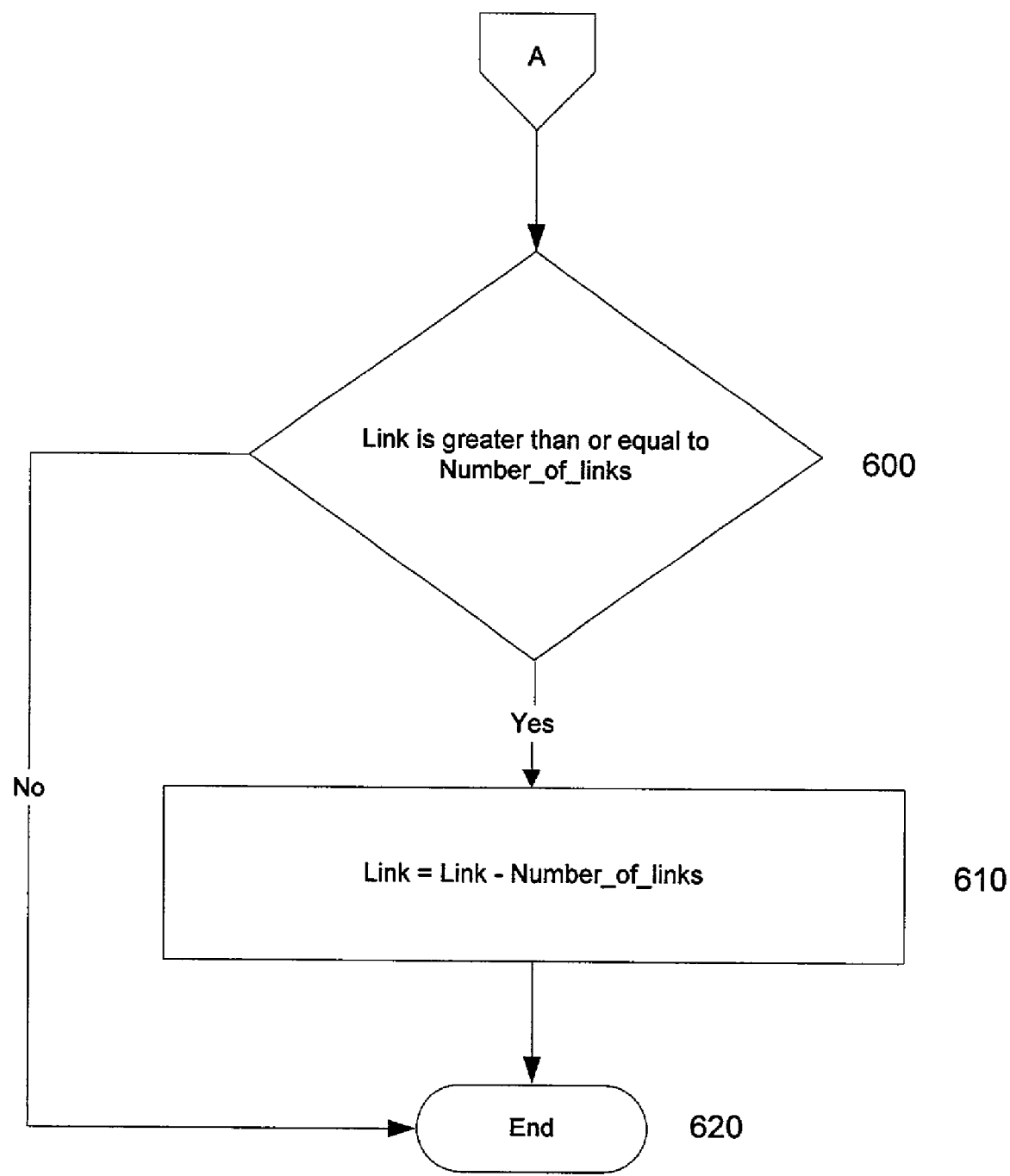

FIGS. 5 and 6 show a first exemplary flow chart diagram for explaining the actual linking of multiple switch fabric systems through a coupling according to the present invention. In step 500 initial values for the position of the MSB and for a number of links register are set to 0 and the actual number of links, respectively. In the loop defined by steps 510 to 520, the actual position of the MSB in the Number of links value is determined. In step 530, the Next 2 power value is calculated by shifting the MSB value 1 position to the left. In step 540 the actual link value is determined by ANDing the received Exchange_ID with the Next 2 power−1. In step 600 (shown in FIG. 6), it is tested whether the link is greater than or equal to the number of links. If not, then this link value is used and the routine ends at step 620. If yes, then the actual link value is modified to the calculated link value minus the number of links and then proceeds to step 620.

Figure 7:
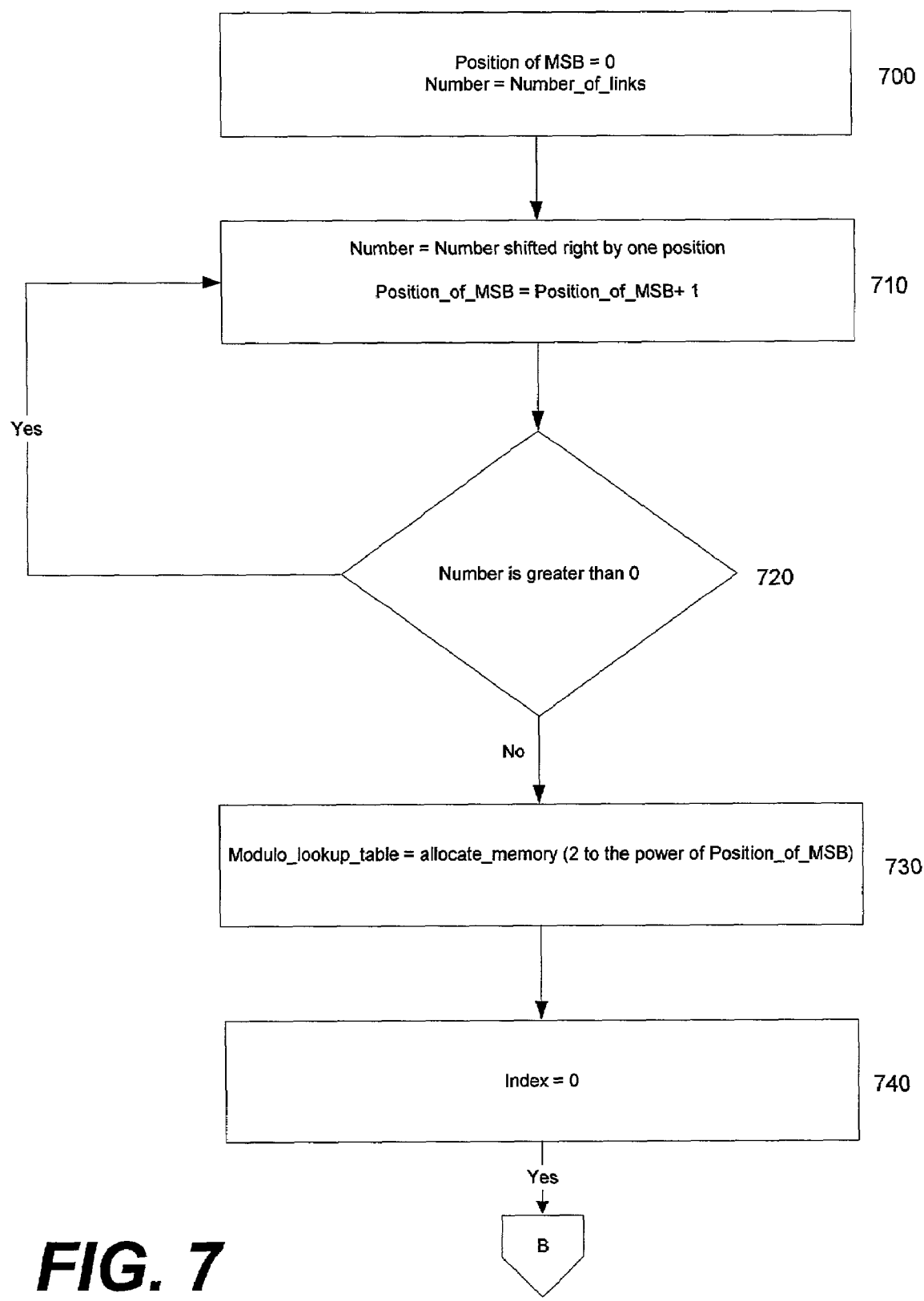
Figure 8:
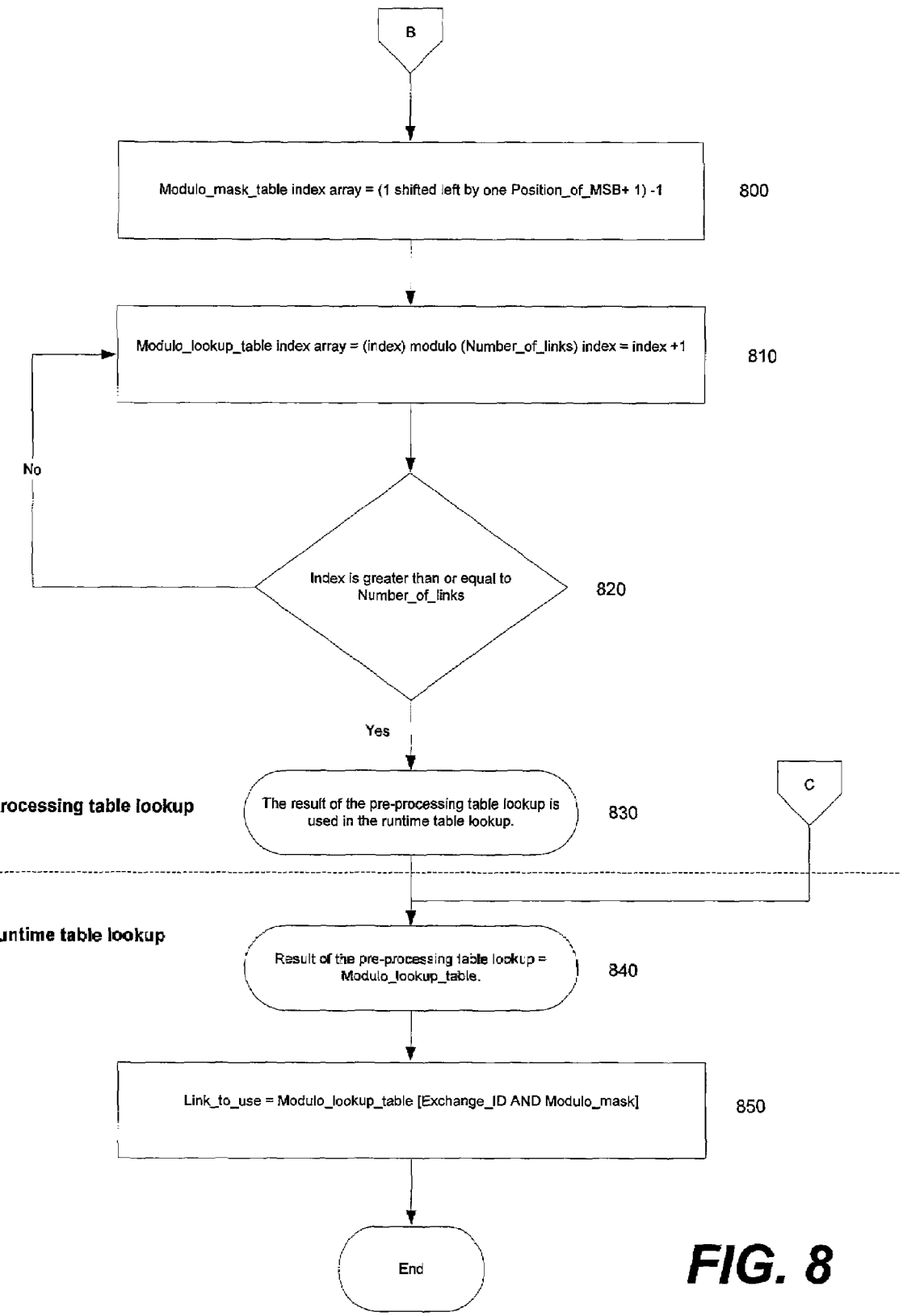

FIGS. 7 and 8 show another exemplary embodiment using a table look-up model. The first time this embodiment is executed, a look-up table is generated during steps 700 to 830. Steps 700-720 are similar to steps 500-520 of FIG. 5 and generate the MSB value. In step 730 memory for the look-up table is allocated and in step 740 an index value is reset to 0. FIG. 8 shows steps 800 to 830 during which the look-up table is preset with the respective values. Steps 840 to 850 are then used during further execution to actually generate the link value by calculating an index value from the exchange_ID by ANDing it with a modulo_mask. Thus, the respective new link value determining one of the link couplings can be generated faster without the need of a plurality of arithmetic calculations.

The above embodiments use the Fibre Channel Protocol for communication. Thus, usually a Fibre Channel Architecture is used within the system. However, the system will also operate with the Fibre Channel Protocol regardless of the actual transport or physical medium. This includes Fibre Channel Protocol encapsulation through other network protocols. The encapsulation is accomplished by storing a Fibre Channel frame into a frame/packet or some other equivalent network protocol construct. Such encapsulation allows a Fibre Channel frame to be routed to another Fibre Channel capable network node using Ethernet, ATM, or other network protocol. The encapsulation is used in, but not limited to, IP packets, ATM packets, and TCP connections.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. Method of linking at least two network switches, wherein each network switch switches data traffic of a plurality of devices, through a plurality of couplings, wherein said method comprises the steps of:
generating a data stream including an identifier to be sent from a first to a second network switch;
generating a number identifying one of said couplings from said identifier using a ceiling adjusted modulo function, the ceiling adjusted modulo function comprising the steps of:
(a) determining a first parameter equal to 2 to the power of the number of couplings modulo 2;
(b) ANDing the first parameter −1 with the identifier;
(c) if the result is greater or equal zero, then subtracting the number of couplings; and
(d) otherwise using the result to determine the coupling; and using said identified coupling for transfer of said data stream.

2. Method according to claim 1, wherein said step of generating a number includes using a look-up table for identifying one of said couplings.

3. Method according to claim 2, further comprising the step of generating a look-up table for determination of said coupling.

4. Method according to claim 1, wherein a Fibre Channel protocol is used to exchange data streams.

5. Network switch for coupling a plurality of devices and for switching data traffic between said devices comprising:
a plurality of couplings for coupling said network switch with another network switch;
a multiplexer unit for directing a data stream to one of said couplings; and
a control unit for extracting an identifier from said data stream and for generating a number identifying one of said couplings from said identifier using a ceiling adjusted modulo function, the ceiling adjusted modulo function comprising the steps of:
(a) determining a first parameter equal to 2 to the power of the number of couplings modulo 2;
(b) ANDing the first parameter −1 with the identifier;
(c) if the result is greater or equal zero, then subtracting the number of couplings; and
(d) otherwise using the result to determine the coupling.

6. Network switch according to claim 5, wherein the control unit comprises a look-up table receiving said identifier for generating said number.

7. Network switch according to claim 5, wherein the control unit comprises a modulo function processing unit receiving said identifier for generating said number.

8. Network switch according to claim 5, wherein at least one of said couplings is a Fibre Channel.

9. Network switch according to claim 5, wherein the number of couplings is equal to $2^x$, where x is any positive integer.

10. Network switch according to claim 5, wherein at least one of said couplings uses the Fibre Channel Protocol for communicating regardless of whether or not the transport or physical medium is Fibre Channel compliant.

11. Network switch system comprising at least a first and a second network switch coupled through a plurality of couplings wherein at least one network switch is coupling a plurality of devices for switching data traffic between said devices and wherein at least one network switch further comprises:
a multiplexer unit for directing a data stream to one of said couplings; and
a control unit for extracting an identifier from said data stream and for generating a number identifying one of said couplings from said identifier using a ceiling adjusted modulo function, the ceiling adjusted modulo function comprising the steps of:
(a) determining a first parameter equal to 2 to the power of the number of couplings modulo 2;
(b) ANDing the first parameter −1 with the identifier;
(c) if the result is greater or equal zero, then subtracting the number of couplings; and
(d) otherwise using the result to determine the coupling.

12. System according to claim 11, wherein the control unit comprises a look-up table receiving said identifier for generating said number.

13. System according to claim 11, wherein the control unit comprises a modulo function processing unit receiving said identifier for generating said number.

14. System according to claim 11, wherein said coupling is a Fibre Channel.

15. System according to claim 11, wherein the number of couplings is equal to $2^x$, where x is any positive integer.

* * * * *